(12) United States Patent
Church

(10) Patent No.: US 6,434,307 B1
(45) Date of Patent: Aug. 13, 2002

(54) LOW PROFILE OPTICAL FIBER RIBBON CABLE

(75) Inventor: Keith D. Church, Wake Forest, NC (US)

(73) Assignee: Alcoa Fujikura Ltd., Brentwood, TN (US)

( * ) Notice: Subject to any disclaimer, the term of this patent is extended or adjusted under 35 U.S.C. 154(b) by 0 days.

(21) Appl. No.: 09/639,270

(22) Filed: Aug. 15, 2000

(51) Int. Cl.$^7$ ................................................ G02B 6/44
(52) U.S. Cl. ...................................................... 385/114
(58) Field of Search ................................ 385/114, 113, 385/100, 106

(56) References Cited

U.S. PATENT DOCUMENTS

| | | | |
|---|---|---|---|
| 5,249,249 A | 9/1993 | Eoll et al. | 385/114 |
| 5,319,730 A * | 6/1994 | Rasanen et al. | 385/114 |
| 5,345,525 A | 9/1994 | Holman et al. | 385/104 |
| 5,668,912 A * | 9/1997 | Keller | 385/100 |
| 5,768,460 A | 6/1998 | Levi et al. | 385/114 |
| 5,802,231 A * | 9/1998 | Nagano et al. | 385/114 |
| 5,848,212 A | 12/1998 | Wagman | 385/111 |
| 5,857,051 A | 1/1999 | Travieso et al. | 385/114 |
| 5,878,180 A * | 3/1999 | Nothofer et al. | 385/114 |
| 6,215,932 B1 * | 4/2001 | Hardwick, III et al. | 385/114 |

* cited by examiner

Primary Examiner—Brian Sircus
Assistant Examiner—Brian S. Webb
(74) Attorney, Agent, or Firm—Tracey D. Beiriger

(57) ABSTRACT

A breakout cable includes a plurality of optical fiber ribbon cables formed into an array. Each optical fiber ribbon cable includes a plurality of optical fibers arranged into at least one row. A first jacket and preferably a second jacket surround the plurality of optical fibers of each optical fiber ribbon cable. An outer sheath surrounds the array of optical fiber ribbon cables. The array of optical fiber ribbon cables and the outer sheath are configured so that a distance between opposite exterior surfaces of the outer sheath is less than a distance between opposite exterior sides of the outer sheath.

12 Claims, 1 Drawing Sheet

LOW PROFILE OPTICAL FIBER RIBBON CABLE

BACKGROUND OF THE INVENTION

1. Field of the Invention

The present invention relates to breakout cables and, more particularly, to breakout cables having a large number of optical fibers.

2. Description of the Prior Art

Breakout cables utilized for wiring premises, such as apartments and commercial buildings, are subject to a number of different stresses during installation. These stresses include longitudinal stresses caused by pulling the breakout cables through plenums and risers, transverse stresses due to bending of the cables around corners, environmental stresses, and other stresses known to those skilled in the art.

Prior art optical fiber breakout cables include a cylindrically-shaped elongated outer sheath for receiving the plurality of optical fibers therein. A problem with utilizing a cylindrically-shaped elongated outer sheath is the need to provide space between jackets that surround groups of optical fibers received within the outer sheath. The need to provide this space results in an undesirable increase in the diameter of the breakout cable.

It is, therefore, an object of the present invention to overcome the above problem and others by providing an optical fiber breakout cable having a low profile. It is another objective of the present invention to provide an optical fiber breakout cable having a small bend radius. Still other objects of the present invention will become apparent to those of ordinary skill in the art upon reading and understanding the following detailed description.

SUMMARY OF THE INVENTION

Accordingly; an optical fiber breakout cable has been invented that includes a plurality of optical fiber ribbon cables arranged in an array having at least two columns and at least two rows. Each optical fiber ribbon cable includes a first jacket and may include a second jacket surrounding a plurality of optical fibers arranged in an array having at least one row. At least one row of each optical fiber ribbon cable is positioned parallel to the rows of the array of optical fiber ribbon cables. An outer sheath surrounds the array of optical fiber ribbon cables. The outer sheath has a top surface and a bottom surface in spaced parallel relation and a pair of outward facing sides. The distance between the top surface and the bottom surface of the outer sheath is less than the distance between the pair of outward facing sides of the outer sheath.

The optical fiber breakout cable can include a plurality of elongated strength members. Preferably, each strength member is positioned between a side of the array of optical fiber ribbon cables and one of the sides of the outer sheath, and between adjacent rows of optical fiber ribbon cables. Preferably, the first jacket is formed from an aramid material, and the second jacket and sheath are formed from polyvinyl chloride (PVC) or polyvinyl difluoride (PVDF). Each strength member is formed from an aramid material. Other various materials with flame retardant capabilities may be used for the jackets or sheath.

The second jacket, if used, surrounds the first jacket. The second jacket can have a top surface and a bottom surface in spaced parallel relation and a pair of outward facing sides. The distance between the top surface and the bottom surface of the second jacket is less than the distance between the pair of outward facing sides of the second jacket.

Preferably, the outer sheath, the first jacket, and the second jacket have oval cross-sections.

DETAILED DESCRIPTION OF THE PREFERRED EMBODIMENTS

Figure 1:
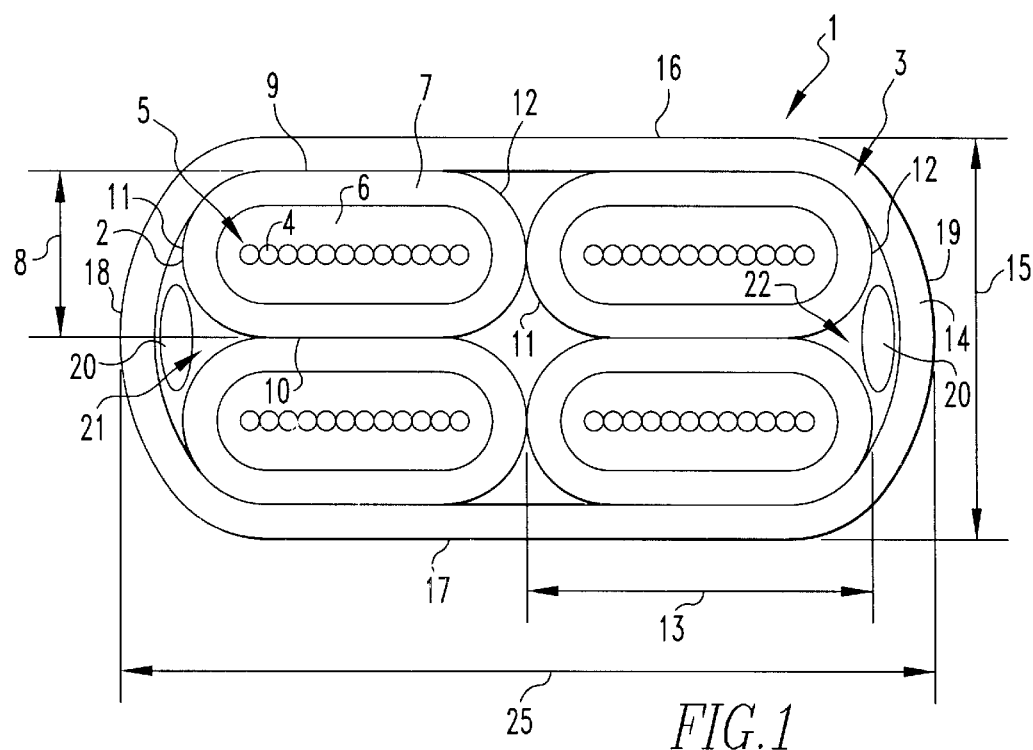
FIG. 1 is a drawing of a cross-section of a breakout cable in accordance with one embodiment of the present invention.

With reference to FIG. 1, a breakout cable 1 includes a plurality of optical fiber ribbon cables 2 arranged in a two column-by-two row array 3. Each fiber optical ribbon cable 2 includes a plurality of optical fibers 4 arranged in twelve column-by-one row array 5. Each ribbon cable 2 is placed flat and longitudinally in cable 1. Note that the ribbons are not helically stranded therefore permitting a smaller diameter cable. A first jacket 6 surrounds array 5 and a second jacket 7 surrounds first jacket 6. Preferably, first jacket 6 is formed from an aramid strength material, such as Kevlar® by E.I. du Pont de Nemours and Company of Wilmington, Del., and second jacket 7 is formed from a plastic, such as polyvinyl chloride (PVC) or polyvinyl difluoride (PVDF). The jackets are attached along their touching tangent in the horizontal plane for additional cable strength. These inner jacket pairs, however, are easily separable when removed from the overall cable allowing easy connectorization.

First jacket 6 and second jacket 7 are formed around optical fiber array 5 such that a distance 8 between a top surface 9 and a bottom surface 10 of second jacket 7 is less than a distance 13 between outward facing sides 11 and 12 of second jacket 7. Preferably, each optical fiber ribbon cable 2 of array 3 is arranged so that the row of optical fibers 4 of each array 5 is parallel to the rows of optical fiber ribbon cables 2 of array 3.

Array 3 is received in an outer sheath 14. A distance 15 between a top surface 16 of outer sheath 14 and a bottom surface 17 of outer sheath 14 is less than a distance 25 between outward facing sides 18 and 19 of outer sheath 14. Preferably, outer sheath 14 is formed from polyvinyl difluoride (PVDF) or polyvinyl chloride (PVC) and has an oval cross-section.

A pair of elongated strength members 20 are positioned between opposite sides 21 and 22 of array 3 and outward facing sides 18 and 19 of outer sheath 14, and between rows of array 3. Strength members 20 help cushion the fibers and increase overall tensile strength of the cable.

Figure 2:
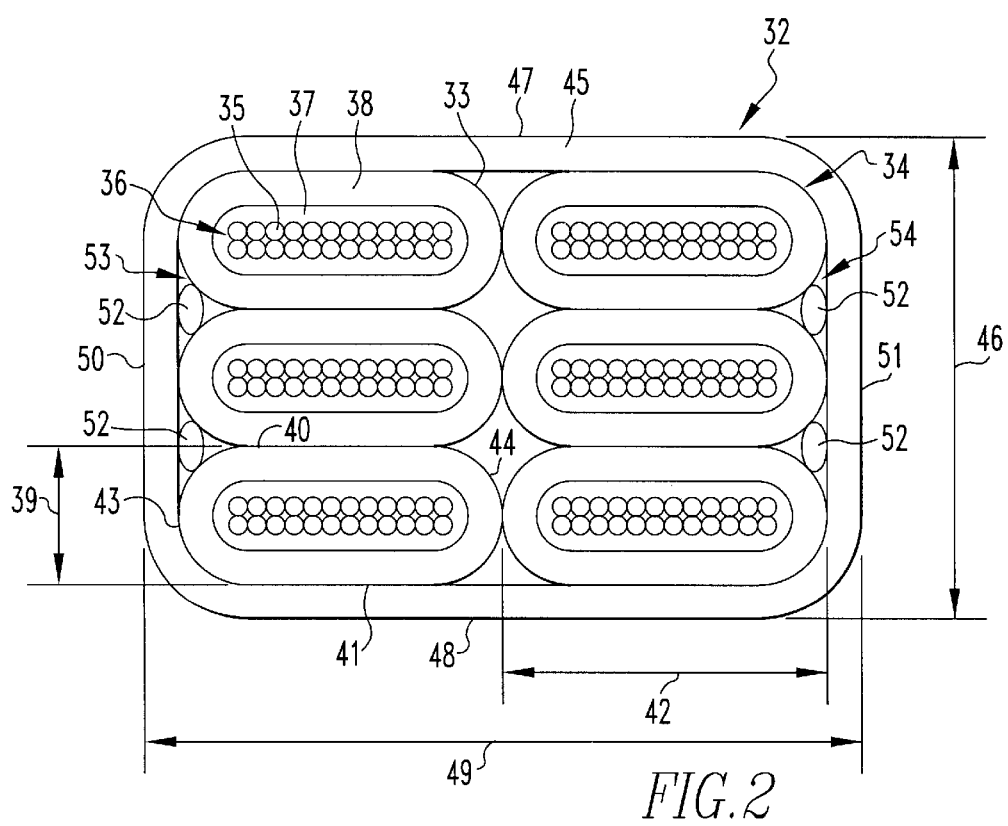
FIG. 2 is a drawing of a cross-section of a breakout cable in accordance with another embodiment of the present invention.

With reference to FIG. 2, a breakout cable 32 includes a plurality of optical fiber ribbon cables 33 arranged into a two column-by-three row array 34. Each optical fiber ribbon cable 33 includes a plurality of optical fibers 35 formed into a twelve column-by-two row array 36. A first jacket 37 surrounds array 36 and a second jacket 38 surrounds first jacket 37. Preferably, first jacket 37 is formed from an aramid strength material and second jacket 38 is formed from PVC or PVDF.

A distance 39 between a top surface 40 and a bottom surface 41 of second jacket 38 is less than a distance 42 between outward facing sides 43 and 44 of second jacket 38. The array 34 of optical fiber ribbon cables 33 is received in an outer sheath 45. A distance 46 between a top surface 47 and bottom surface 48 of outer sheath 45 is less than a distance 49 between outward facing sides 50 and 51 of outer sheath 45.

A plurality of elongated strength members 52 are positioned between opposite sides 53 and 54 of array 34 and outward facing sides 50 and 51 of outer sheath 45, and between adjacent rows of array 34. Preferably, outer sheath 34 is formed from PVDF or PVC and has an oval cross-section.

As can be seen, the present invention provides a breakout cable having a distance between top and bottom surfaces of an outer sheath that is less than a distance between outward facing sides of the outer sheath. The resulting breakout cable is a low profile cable that is designed for easy breakout to mate with standard connectors without additional preparation. Because of the flat nature of the cable, it is easier to bend and route through densely packed termination enclosures. The low profile and relatively small cross section of this cable allows for a working bend radius of less than 1.0 inches without causing undesirable attenuation increases or power losses.

The present invention has been described with reference to the preferred embodiments. Obvious modifications and alterations will occur to those of ordinary skill in the art upon reading and understanding the preceding detailed description. For example, different sizes of the arrays of optical fiber ribbon cables and the arrays of optical fiber can be used. It is intended that the invention be construed as including all such modifications and alterations insofar as they come within the scope of the appended claims or the equivalents thereof.

I claim:

1. An optical fiber breakout cable comprising:
   a plurality of ribbon cables arranged in an array which, in cross-section, has at least two columns and at least two rows, each ribbon cable including a jacket surrounding a plurality of optical fibers which are arranged in an array which, in cross-section, has at least one row, each jacket having an oval cross-section including top and bottom surfaces disposed parallel to each row of optical fibers and curved side surfaces which extend between the top and bottom surfaces of the jacket; and
   an outer sheath surrounding the array of ribbon cables, the outer sheath having, in cross-section, top and bottom surfaces disposed parallel to the top and bottom surfaces of each jacket and a pair of sides with outward facing side surfaces having arcuate ends which merge with the top and bottom surfaces of the outer sheath, wherein:
   a distance between the top and bottom surfaces of the outer sheath is less than a distance between the pair of outward facing side surfaces of the outer sheath; and
   the pair of sides of the outer sheath have inward facing side surfaces having arcuate ends each of which at least partially abuts at least a segment of one of the curved side surfaces of one of the jackets.

2. The breakout cable as set forth in claim 1, further including a plurality of elongate strength members, with each strength member positioned (i) between a side of the array of ribbon cables and one of the inward facing side surfaces of the outer sheath and (ii) between adjacent rows of ribbon cables.

3. The breakout cable as set forth in claim 1, wherein each ribbon cable further includes another jacket having an oval cross-section received in the jacket, with an exterior surface of the other jacket abutting an interior surface of the jacket.

4. The breakout cable as set forth in claim 3, wherein:
   the jacket is formed from polyvinyl chloride (PVC) or polyvinyl difluoride (PVDF);
   the other jacket is formed from an aramid material;
   the outer sheath is formed from polyvinylidene chloride (PVDF) or polyvinyl difluoride chloride (PVC); and
   each strength member is formed from an aramid material.

5. The breakout cable as set forth in claim 1, wherein the outer sheath has an oval cross section.

6. An optical fiber breakout cable comprising:
   a sheath having a top surface and a bottom surface in spaced parallel relation and a pair of sides with outward facing side surfaces having curved ends which merge with the top and bottom surfaces of the sheath, with a distance between the top and bottom surfaces being less than a distance between the pair of outward facing side surfaces; and
   a plurality of ribbon cables received in the sheath and arranged in an array having at least two columns and at least two rows, each ribbon cable including a jacket surrounding a plurality of optical fibers arranged in an array having at least one row, each jacket having an oval cross-section including top and bottom surfaces disposed parallel to the at least one row of optical fibers and curved side surfaces which extend between the top and bottom surfaces, wherein:
   the top and bottom surfaces of each jacket are disposed parallel to the top and bottom surfaces of the sheath; and
   the pair of sides of the sheath have inward facing side surfaces with curved ends each of which at least partially abuts at least a segment of one of the curved side surfaces of one of the jackets.

7. The breakout cable as set forth in claim 6, further including a plurality of elongate strength members, with each strength member positioned between a side of the array of ribbon cables and one of the sides of the sheath.

8. The breakout cable as set forth in claim 7, wherein each strength member is also positioned between adjacent rows of ribbon cables.

9. The breakout cable as set forth in claim 6, wherein each ribbon cable further includes another jacket surrounded by the jacket.

10. The breakout cable as set forth in claim 6, wherein the array of ribbon cables is one of (i) a two row by two column array, and (ii) a two row by three column array.

11. The breakout cable as set forth in claim 6, wherein the sheath has an oval cross-section.

12. The breakout cable as set forth in claim 9, wherein:
   the other jacket has an oval cross-section; and
   an exterior surface of the other jacket abuts and interior surface of the jacket.

* * * * *